US010359785B2

(12) United States Patent
Litwinowicz

(10) Patent No.: US 10,359,785 B2
(45) Date of Patent: Jul. 23, 2019

(54) TOUCHDOWN ORIENTATION CONTROL SYSTEM FOR A ROTARY WING AIRCRAFT AND METHOD

(71) Applicant: Sikorsky Aircraft Corporation, Stratford, CT (US)

(72) Inventor: Anthony Litwinowicz, Derby, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 373 days.

(21) Appl. No.: 15/403,807

(22) Filed: Jan. 11, 2017

(65) Prior Publication Data

US 2017/0285660 A1 Oct. 5, 2017

Related U.S. Application Data

(60) Provisional application No. 62/316,301, filed on Mar. 31, 2016.

(51) Int. Cl.
| | |
|---|---|
| G06F 19/00 | (2018.01) |
| G05D 1/06 | (2006.01) |
| B64C 13/50 | (2006.01) |
| B64C 27/57 | (2006.01) |
| G05D 1/08 | (2006.01) |
| B64C 27/04 | (2006.01) |
| B64C 27/82 | (2006.01) |

(52) U.S. Cl.
CPC ......... *G05D 1/0676* (2013.01); *B64C 13/503* (2013.01); *B64C 27/04* (2013.01);
(Continued)

(58) Field of Classification Search
CPC .... G05D 1/0676; G05D 1/0858; B64C 27/82; B64C 27/04; B64C 13/503; B64C 27/57
(Continued)

(56) References Cited

U.S. PATENT DOCUMENTS

| | | | | | |
|---|---|---|---|---|---|
| 6,145,428 | A | * | 11/2000 | Gold | ............ F41G 9/002 244/17.13 |
| 7,106,217 | B2 | * | 9/2006 | Judge | ............ G01C 23/00 340/970 |

(Continued)

FOREIGN PATENT DOCUMENTS

| | | |
|---|---|---|
| EP | 2937283 A1 | 10/2015 |
| WO | 2004025386 A1 | 3/2004 |

OTHER PUBLICATIONS

European Search Report; Application No. 17153286.4-1754; dated Jul. 17, 2018; 5 pages.

*Primary Examiner* — Shardul D Patel
(74) *Attorney, Agent, or Firm* — Cantor Colburn LLP

(57) ABSTRACT

A rotary wing aircraft control system includes an airframe, a main rotor assembly supported by the airframe, and a control system arranged in the airframe and operatively connected to the main rotor assembly. The control system includes a flight control computer (FCC), at least one control inceptor device and a touchdown orientation control system. The touchdown orientation control system includes a computer readable program code an FCC to: sense, by a sensor operatively connected to the flight control computer (FCC), an altitude of the rotary wing aircraft relative to a landing surface, determine one of a landing state rearward velocity reference limit value and a landing state lateral velocity reference limit value associated with the altitude, and selectively limit a landing state flight envelope of the rotary wing aircraft to the one of the landing state rearward velocity reference limit value and the landing state lateral velocity reference limit value.

15 Claims, 2 Drawing Sheets

(52) U.S. Cl.
CPC .............. *B64C 27/57* (2013.01); *B64C 27/82* (2013.01); *G05D 1/0858* (2013.01)

(58) Field of Classification Search
USPC ............ 701/3, 10, 16, 17; 244/30, 175, 180; 901/1
See application file for complete search history.

(56) References Cited

U.S. PATENT DOCUMENTS

| | | | |
|---|---|---|---|
| 2009/0012658 A1* | 1/2009 | Cherepinsky | B64C 27/006 701/3 |
| 2009/0152391 A1* | 6/2009 | McWhirk | B64B 1/02 244/30 |
| 2009/0266940 A1* | 10/2009 | Miller | B64C 13/10 244/223 |
| 2013/0221153 A1* | 8/2013 | Worsham, II | B64C 27/006 244/17.13 |
| 2014/0249702 A1* | 9/2014 | Pflug | B64C 25/001 701/16 |
| 2015/0066240 A1* | 3/2015 | Das Adhikary | G01C 21/12 701/1 |
| 2015/0073627 A1* | 3/2015 | Fang | B64C 27/008 701/3 |
| 2015/0314855 A1* | 11/2015 | Luszcz | B64C 27/72 701/3 |
| 2017/0291699 A1* | 10/2017 | Hunter | B64C 27/10 |
| 2017/0322069 A1* | 11/2017 | Mastrianni | G01G 19/07 |

* cited by examiner

TOUCHDOWN ORIENTATION CONTROL SYSTEM FOR A ROTARY WING AIRCRAFT AND METHOD

CROSS-REFERENCE TO RELATED APPLICATIONS

This application claims priority to U.S. Patent Application No. 62/316,301, filed Mar. 31, 2016, which is hereby incorporated herein by reference in its entirety.

STATEMENT OF FEDERAL SUPPORT

This invention was made with Government support under Contract No.: W911W6-12-2-0005 awarded by the United States Army. The Government has certain rights in the invention.

BACKGROUND

Exemplary embodiments pertain to the art of aircraft and, more particularly, to a touchdown orientation control system for a rotary wing aircraft.

A rotary wing aircraft include one or more rotors that provide lift, yaw control, and/or forward movement. More specifically, rotary wing aircraft include a main rotor assembly that provides lift and a tail rotor assembly that provides yaw control or, in the case of a propulsor, energy for forward movement. In some cases, both the main rotor assembly and the propulsor include dual rotor assemblies. The dual rotor assemblies may represent counter rotating rotors or co-rotating rotors.

Rotary wing aircraft typically descend for a touchdown along a desired path. The desired path typically includes a descent rate and may also include a forward component. Under certain conditions, a flight path of the rotary wing aircraft may attain an undesired lateral and/or rearward component. The lateral component may have resulted from input by a pilot or result from external forces such as air currents. In a degraded visual environment (DVE), the pilot is more susceptible to attaining undesired lateral and/or rearward components. Further, in a DVE, the pilot may not be aware of the existence of the undesired lateral and/or rearward components. Lateral and/or rearward landing/hover paths can result in a dynamic rollover condition or lead to undesirable contact with obstacles at or near the ground.

BRIEF DESCRIPTION

Disclosed is a rotary wing aircraft control system including an airframe, a main rotor assembly supported by the airframe, and a control system arranged in the airframe and operatively connected to the main rotor assembly. The control system includes a flight control computer (FCC), at least one control inceptor device and a touchdown orientation control system. The touchdown orientation control system includes a computer readable program code embodied therewith. The computer readable program code, when executed by the FCC, causes the FCC to: sense, by a sensor operatively connected to a flight control computer (FCC), an altitude of the rotary wing aircraft relative to a landing surface, determine, through the FCC, one of a landing state rearward velocity reference limit value and a landing state lateral velocity reference limit value associated with the altitude, and selectively limit, by the FCC, a landing state flight envelope of the rotary wing aircraft to the one of the landing state rearward velocity reference limit value and the landing state lateral velocity reference limit value.

Also disclosed is a method of controlling touchdown orientation for a rotary wing aircraft including sensing, by a sensor operatively connected to a flight control computer (FCC), an altitude of the rotary wing aircraft relative to a landing surface, determining, through the FCC, one of a landing state rearward velocity reference limit value and a landing state lateral velocity reference limit value associated with the altitude, and limiting, by the FCC, a landing state flight envelope of the rotary wing aircraft to the one of the landing state rearward velocity reference limit value and the landing state lateral velocity reference limit value.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
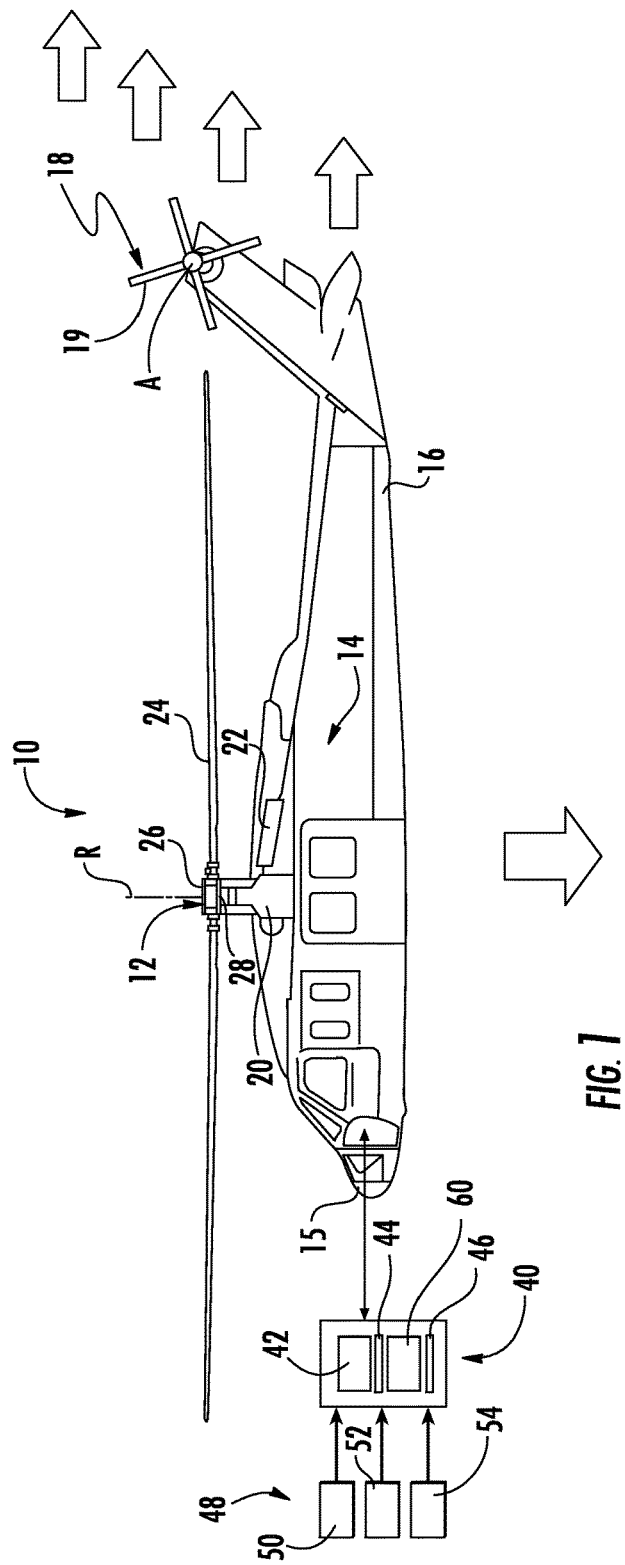
FIG. 1 depicts side view of a rotary wing aircraft including a touchdown orientation system, in accordance with an exemplary embodiment.
Figure 2:
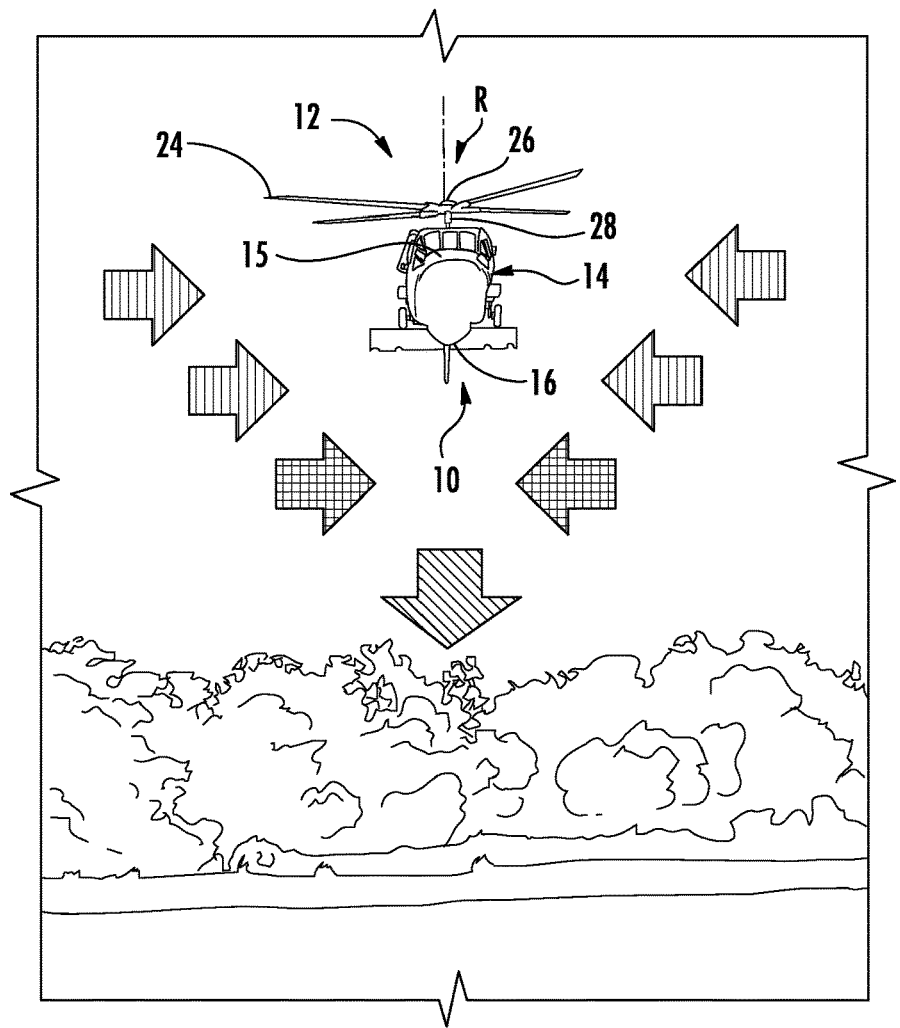
FIG. 2 is a front view of the rotary wing aircraft of FIG. 1.

FIGS. 1 and 2 schematically illustrate a rotary wing aircraft 10 having a main rotor assembly 12. The aircraft 10 includes an airframe 14 having a nose 15 an extending tail 16 which mounts a tail rotor assembly 18, such as an anti-torque system, a translational thrust system, a pusher propeller, a rotor propulsion system, and the like. Tail rotor system includes a plurality of tail rotor blades 19 that rotate about a tail rotor axis "A". The main rotor assembly 12 is driven about a main rotor axis R through a gearbox (illustrated schematically at 20) by one or more engines 22. Main rotor axis R is substantially perpendicular to tail rotor axis A. Main rotor assembly 12 includes a plurality of rotor blades, one of which is indicated at 24, mounted to a rotor hub 26.

A swashplate 28 provides control movements to rotor blades 24. More specifically, swashplate 28 is activated to affect a state or orientation of the rotor blades 24. Although a particular helicopter configuration is illustrated and described in the disclosed embodiment, other configurations and/or machines, such as high speed compound rotary wing aircraft with supplemental translational thrust systems, dual contra-rotating, or co-rotating coaxial rotor system aircraft, turbo-props, tilt-rotors and tilt-wing aircraft, may also benefit from the exemplary embodiments.

Rotary wing aircraft 10 includes a control system 40 which may employ fly-by-wire (FBW) controls 42 that provide inputs to swashplate 28 and/or tail rotor assembly 18. Control system 40 includes an altitude sensor 44, a ground speed sensor 46 and a plurality of control inceptor devices 48. Control inceptor devices 48 may include a cyclic incepter 50, a collective inceptor 52 and pedals 54 which may be manipulated to provide input(s) to control system 40.

The commands provided by control inceptor devices 48 through control system 40 depend on an operational mode of rotary wing aircraft 10.

Figure 3:
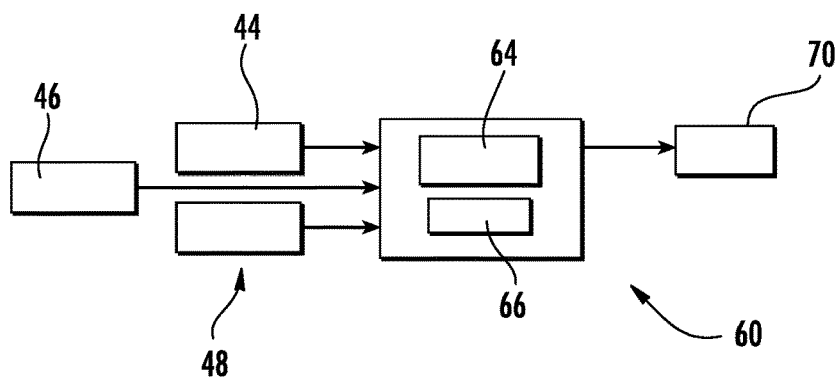
FIG. 3 is a block diagram illustrating the touchdown orientation system, in accordance with an exemplary embodiment.

In accordance with an aspect of an exemplary embodiment, control system 40 includes a touchdown orientation control system 60. As seen in FIG. 3, touchdown orientation control system 60 includes a flight control computer (FCC) 64 and a non-transient memory 66. FCC 64 is operatively connected with FBW controls 42, altitude sensor 44 and control inceptor devices 48. As will be detailed more fully below, touchdown orientation control system 60 establishes secondary or landing state flight envelope for rotary wing aircraft 10. The landing state flight envelope includes a secondary or landing state rearward velocity reference limit and/or a secondary or landing state lateral velocity reference limit as rotary wing aircraft 10 approaches a landing surface. In accordance with an aspect of an exemplary embodiment, the landing state rearward velocity reference limit may take the form of an in-detent rearward velocity reference limit and the landing state lateral velocity reference limit may take the form of an in-detent lateral velocity reference limit indicated generally at 70. Velocity reference limits 70 can reduce pilot workload during landing by automatically removing undesirable lateral and rearward velocities during touchdown. The reduction of pilot workload is particularly desirable in degraded visual environment (DVE) flight conditions. In the event an increase in one or more of rearward and/or lateral velocity over that set by the reference limit is desired, a pilot need simply manipulate one of control inceptor devices 48 out of detent. For example, when operating in an attitude command velocity hold (ACVH) function of the FCC, the pilot may move cyclic inceptor 50 out of detent to adjust aircraft attitude and increase rearward and/or lateral velocity over limits established by touchdown orientation control system 60. When cyclic inceptor 50 returns to detent, attitude may return to "zero" while the increase in lateral and/or rearward velocity is reduced by the control system to the limits established by touchdown orientation control system 60.

In accordance with an aspect of an exemplary embodiment, a pilot may move one or more of control incepter devices 48 into detent prior to touch down. One or more remaining ones of control incepter devices 48 may be manipulated to signal FBW controls 42 to control one or more control surfaces of main rotor assembly 12 and/or tail rotor assembly 18 to guide rotary wing aircraft 10 toward touchdown. Once rotary wing aircraft 10 reaches a predetermined altitude, as sensed by altitude sensor 44, touchdown orientation control system 60 begins to limit the in-detent rearward velocity reference and/or the in-detent lateral velocity reference of the ACVH.

For example, once rotary wing aircraft 10 reaches about 500-feet (152.4-meters) above ground or other landing surface such as a deck of a ship or other landing platform at or above ground level, touchdown orientation control system 60 begins to limit the in-detent rearward velocity reference and/or the in-detent lateral velocity reference. As rotary wing aircraft 10 continues downward, touchdown orientation control system 60 continues to reduce the in-detent rearward velocity reference limit and/or the in-detent lateral velocity reference limit. Once rotary wing aircraft 10 reaches an altitude of about 30-feet (9.15 meters), touchdown orientation and control system 60 may reduce the in-detent rearward velocity reference limit and/or the in-detent lateral velocity reference limit to zero "0". In short, at higher altitudes the velocity reference limit is higher than at lower altitudes. At a certain altitude, the velocity reference limit may be at or near zero. In this manner, touchdown orientation and control system 60 reduces pilot workload by selectively adjusting the orientation of the aircraft during touchdown and eliminates or at least substantially reduces any likelihood of unintended dynamic rollover, collisions or the like.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotary wing aircraft control system comprising:
    an airframe;
    a main rotor assembly supported by the airframe;
    a control system arranged in the airframe and operatively connected to the main rotor assembly, the control system including a flight control computer (FCC), at least one control inceptor device and a touchdown orientation control system, the touchdown orientation control system including a computer readable program code embodied therewith, the computer readable program code, when executed by the FCC, causes the FCC to:
        sense, by a sensor operatively connected to a flight control computer (FCC), an altitude of the rotary wing aircraft relative to a landing surface;
        determine, through the FCC, one of a landing state rearward velocity reference limit value and a landing state lateral velocity reference limit value associated with the altitude; and
        selectively limit, by the FCC, an in-detent flight envelope of the rotary wing aircraft to the one of the landing state rearward velocity reference limit value and the landing state lateral velocity reference limit value.

2. The rotary wing aircraft according to claim 1, wherein the one of the landing state rearward velocity reference limit value and the landing state lateral velocity reference limit value is reduced as the rotary wing aircraft approaches touchdown on the landing surface.

3. The rotary wing aircraft according to claim 1, wherein determining, through the FCC, one of the landing state rearward velocity reference limit value and the landing state lateral velocity reference limit value includes determining at least one of an in-detent rearward velocity reference limit value and an in-detent lateral velocity reference limit value.

4. The rotary wing aircraft according to claim 1, wherein determining, through the FCC, the one of the landing state rearward velocity reference limit value and the landing state lateral velocity reference limit value includes setting a zero velocity reference limit value for the one of the landing state rearward velocity reference limit value and the landing state lateral velocity reference limit value when the altitude is lower than about 30-feet (9.15 meters).

5. The rotary wing aircraft according to claim 1, wherein the control incepter comprises a cyclic incepter.

6. The rotary wing aircraft according to claim 1, wherein the airframe includes an extending tail supporting a tail rotor assembly.

7. The rotary wing aircraft according to claim 6, wherein the main rotor assembly includes a rotor hub that rotates about a main rotor axis and the tail rotor assembly includes a plurality of tail rotor blades that rotate about a tail rotor axis that is substantially perpendicular to the main rotor axis.

8. The rotary wing aircraft according to claim 1, wherein the landing state flight envelope of the rotary wing aircraft is further limited as the rotary wing aircraft approaches the landing surface.

9. A method of controlling touchdown orientation for a rotary wing aircraft comprising:
sensing, by a sensor operatively connected to a flight control computer (FCC), an altitude of the rotary wing aircraft relative to a landing surface;
determining, through the FCC, one of a landing state rearward velocity reference limit value and a landing state lateral velocity reference limit value associated with the altitude; and
limiting, by the FCC, a landing state flight envelope of the rotary wing aircraft to the one of the landing state rearward velocity reference limit value and the landing state lateral velocity reference limit value.

10. The method of claim 9, wherein an landing state rearward velocity reference limit value and the landing state lateral velocity reference limit value is reduced as the rotary wing aircraft approaches the landing surface.

11. The method of claim 9, wherein determining, through the FCC, one of the landing state rearward velocity reference limit value and the landing state lateral velocity reference limit value includes determining each of the landing state rearward velocity reference limit value and the landing state lateral velocity reference limit value.

12. The method of claim 9, wherein determining, through the FCC, the one of the landing state rearward velocity reference limit value and the landing state lateral velocity reference limit value includes setting a zero velocity reference limit value for the one of the landing state rearward velocity reference limit value and the landing state lateral velocity reference limit value when the altitude is lower than about 30-feet (9.15 meters).

13. The method of claim 9, further comprising: overriding the one of the landing state rearward velocity reference limit value and the landing state lateral velocity reference limit value by moving a control inceptor out of detent.

14. The method of claim 13, wherein moving the control inceptor out of detent includes moving a cyclic incepter out of detent.

15. The method of claim 9, limiting, by the FCC, the landing state flight envelope of the rotary wing aircraft includes activating a fly-by-wire system.

* * * * *